United States Patent
Kinoshita et al.

[11] Patent Number: 5,824,394
[45] Date of Patent: Oct. 20, 1998

[54] BIAXIALLY ORIENTED LAMINATED POLYESTER FILM

[75] Inventors: Shinichi Kinoshita, Tokyo; Narihiro Masuda, Nagahama, both of Japan

[73] Assignee: Diafoil Hoechst Company, Limited, Tokyo, Japan

[21] Appl. No.: 570,436

[22] Filed: Dec. 11, 1995

[51] Int. Cl.$^6$ ............ B32B 15/08; B32B 27/08; B32B 27/30; B32B 27/36

[52] U.S. Cl. ............ 428/195; 428/216; 428/336; 428/423.7; 428/458; 428/480; 428/483; 428/910; 427/585; 427/79; 427/81; 427/331; 427/412.5; 264/173.16; 264/289.3; 264/289.6; 264/290.2

[58] Field of Search .................. 428/423.7, 458, 428/480, 483, 694 TS, 694 BS, 910, 216, 195, 336; 427/585, 79, 80, 81, 331, 412.5; 264/173.16, 289.3, 289.6, 290.2

[56] References Cited

U.S. PATENT DOCUMENTS

| | | | |
|---|---|---|---|
| 3,740,254 | 6/1973 | Lansbury et al. | 117/71 R |
| 4,011,358 | 3/1977 | Roelofs | 428/287 |
| 4,571,363 | 2/1986 | Culbertson et al. | 428/332 |
| 4,755,337 | 7/1988 | Takahashi et al. | 264/134 |
| 4,795,672 | 1/1989 | Takeda et al. | 428/216 |
| 4,978,708 | 12/1990 | Fowler et al. | 524/507 |
| 5,019,418 | 5/1991 | Linzey et al. | 427/79 |
| 5,106,681 | 4/1992 | Endo et al. | 428/323 |

FOREIGN PATENT DOCUMENTS

| | | |
|---|---|---|
| 0 429 936 | 6/1991 | European Pat. Off. . |
| 0 432 886 | 6/1991 | European Pat. Off. . |
| 0 635 824 | 1/1995 | European Pat. Off. . |
| 2-050837 | 2/1990 | Japan . |
| 94/13479 | 6/1994 | WIPO . |

OTHER PUBLICATIONS

Schmitz, Peter et al., "Films." Ullmann's Encyclopedia of Industrial Chemistry, 5th Ed., vol. A11, pp. 85, 91–94, 105–106, 108–110, Jan. 1988.

Database WPI, Derwent Publications Ltd., London, GB; AN 94–173318, JP 06–115 030, Toray Ind. Inc., Apr. 16, 1994.

*Primary Examiner*—Vivian Chen
*Attorney, Agent, or Firm*—Foley & Lardner

[57] ABSTRACT

A biaxially oriented laminated polyester film, comprises a layer A having a thickness of 0.5 μm, composed of a polyester having no crystalline melt peak at not less than 230° C. in the differential thermal analysis and laminated on at least one surface of another polyester layer, with a coating layer containing not less than 50 wt % of an acrylic resin or urethane resin as a coating component being formed on the surface of said layer A.

21 Claims, No Drawings

BIAXIALLY ORIENTED LAMINATED POLYESTER FILM

BACKGROUND OF THE INVENTION

The present invention relates to a biaxially oriented laminated polyester film and a base film for sublimation type thermal transfer or for metallized film capacitor composed of the said polyester film.

Polyester films such as polyethylene terephthalate (PET) film and polyethylene naphthalate (PEN) film have excellent mechanical strength, heat resistance, dimensional stability, electrical insulation, chemical resistance and optical properties, which are almost all film properties required to possess. Therefore, polyester film is ranked between general-purpose film and engineering plastic film, and is used for many applications as a high-quality film which has few faults and high cost performance.

Use of polyester film is increasingly expanding and has a tendency to diversify. Consequently, polyester film is required to meet even a wider scope of property requirements. Particularly, adhesiveness of the film surface is one of the important property requirements. When, for instance, a functional layer such as deposited metal layer, magnetic layer, photosensitive layer, printing layer, adhesive layer, release layer or the like is formed on the polyester film surface or other polymer layer is laminated thereon, the film surface is required to have enough adhesiveness in which such functional layer does not peel off easily.

It has been common practice to provide an undercoat layer on the polyester film surface for bettering adhesion between the polyester film and the said functional layer. The method for forming this undercoat layer can be roughly divided into two types: (i) off-line coating method in which coating is conducted after the film has been formed, and (I) in-line coating method in which coating is conducted in the film forming process and the coated film is further stretched. The presence of such an undercoat layer can vary wettability of the polyester film surface over a wide extent depending on the undercoat layer composition, resulting in an improved adhesiveness of the film surface to the various functional layers.

However, when an undercoat layer is provided considering to its adhesiveness to the functional layer, there may arise the problem of easier separation of the undercoat layer from the polyester film surface at their interface because of poor compatibility of the film surface and the said undercoat layer. This problem is amplified in the case where the functional layer contains a polymer with high affinity for water, such as gelatin, polyvinyl alcohol (PVA), polyvinyl butyral (PVB), cellulose or their derivatives.

The commercial articles having the said functional layer include, for instance, photographic film, ink image receiving film and plate-making film. Acrylic resin is a typical example of resin having good adhesiveness to the said functional layers.

An undercoat layer of acrylic resin, however, tends to separate easily from the polyester film at the interface because of poor compatibility with the polyester film.

Thermal transfer recording system is prevailing for its advantageous features such as clear printing, simplicity of the apparatus and no noise. Particularly, sublimable ink transfer type recording system, which is principally designed for use in copying of images such as video printer images, is expanding its scope of use, since this recording system is excellent in gradation as compared with molten ink transfer type, and polyester film has been used as base film for such sublimation type thermal transfer.

However, in case of using a sublimation-type ink layer binder which allows easy sublimation of ink, there arises the problem that the ink layer is often attached to the image receiving paper during thermal transfer operation because of improper adhesion between the sublimable ink layer and the base film. For improving adhesion between the ink layer and the base film, it has been tried to provide an easily adherable undercoat layer at their interface. However, in case of providing an undercoat layer designed to better adhesiveness to the sublimable ink layer to satisfy the required level of adhesion, although adhesiveness to the ink layer is bettered, there still is the possibility of separation of the undercoat layer from the base film surface due to poor compatibility between them.

As a result of the present inventors' studies for overcoming the above problems, it has been found that by use of a polyester film having a specific construction, it is possible to remarkably improve adhesiveness of the polyester film layer to any kind of functional layer. On the basis of the finding, the present invention has been attained.

SUMMARY OF THE INVENTION

An object of the present invention is to provide a biaxially oriented laminated polyester film with improved adhesiveness.

Another object of the present invention is to provide a base film for sublimation type thermal transfer using the said biaxially oriented laminated polyester film.

Still another object of the present invention is to provide a base film for metallized film capasitor using the said biaxially oriented laminated polyester film.

To accomplish the aim, in a first aspect of the present invention, there is provided a biaxially oriented laminated polyester film comprising a polyester film (B layer), a layer (layer A) which has a thickness not more than 2 μm, which is composed of a polyester which has no crystalline melt peak at a temperature not less than 230° C. in differential thermal analysis and which is coextrusion-laminated on at least one side of the polyester film (B layer), and a coating layer which contains not less than 50 wt % of an acrylic-based resin or an urethane-based resin and which is formed on the surface of the layer A.

In a second aspect of the present invention, there is provided a base film for sublimation type thermal transfer recording comprising a biaxially oriented laminated polyester film comprising a polyester film (B layer), a layer (layer A) which has a thickness not more than 2 μm, which is composed of a polyester which has no crystalline melt peak at a temperature not less than 230° C. in differential thermal analysis and which is coextrusion-laminated on at least one side of the polyester film (B layer), and a coating layer which contains not less than 50 wt % of an acrylic-based resin or an urethane-based resin and which is formed on the surface of the layer A.

In a third aspect of the present invention, there is provided a base film for metallized film capacitor comprising a biaxially oriented laminated polyester film comprising a polyester film (B layer), a layer (layer A) which has a thickness not more than 2 μm, which is composed of a polyester which has no crystalline melt peak at a temperature not less than 230° C. in differential thermal analysis and which is coextrusion-laminated on at least one side of the polyester film (B layer), and a coating layer which contains not less than 50 wt % of an acrylic-based resin or an urethane-based resin and which is formed on the surface of the layer A.

DETAILED DESCRIPTION OF THE INVENTION

The biaxially oriented polyester film according to the present invention has a construction in which a polyester layer (layer A) having specific properties is laminated by coextrusion on at least one side of an ordinary polyester layer. The polyester layer A is composed of a polyester specified by the fact that there exists no crystalline melt peak at a temperature not less than 230° C., preferably not less than 210° C. in differential thermal analysis. The "differential thermal analysis" referred to herein means an analysis carried out at a heating rate of 10° C./min using a differential scanning calorimeter (DSC). The expression of "there exists no crystalline melt peak" means that the top of the crystalline melt peak does not exist in the said temperature range. The polyesters in which the bottom of crystalline melt peak lies in the said temperature range are included in the polyesters usable in the present invention.

It is essential for the polyester composing the layer A that when it is crystallizable, its crystalline melt peak be not more than 230° C., but the layer A may be composed of a polyester having no crystallizability. The polyester used for the layer A can be obtained by polycondensing a diol and a dicarboxylic acid such as mentioned below.

The diols usable as layer A component include ethylene glycol, propanediol, butanediol, neopentyl glycol, pentanediol, hexanediol, octanediol, decanediol, cyclohexanedimethanol, diethylene glycol, triethylene glycol, polyethylene glycol, tetramethylene glycol and the like. The dicarboxylic acids usable as another layer A component include terephthalic acid, isophthalic acid, phthalic acid, naphthalenedicarboxylic acid, metal salts of 4-sulfonylisophthalic acid, bisphenyldicarboxylic acid, succinic acid, glutaric acid, adipic acid, azelaic acid, sebacic acid, cyclohexanedicarboxylic acid, oxalic acid, malonic acid and the like.

Fine particles may be contained in the layer A for the purpose of improving slip property of the film. As such fine particles, there can be used those of calcium carbonate, calcium phosphate, barium sulfate, titanium oxide, kaolin, talc, clay, alumina, silica, carbon black and the like. The crosslinked organic particles such as crosslinked polystyrene resin and crosslinked acrylic-based resin are also usable. It is possible to use only one kind of the said particles or to use two or more kinds of the said particles in admixture. The average size (diameter) of the particles used in the present invention is usually in a range of 0.001 to 3.0 $\mu$m, preferably 0.01 to 2.0 $\mu$m. The amount of the particles used in the present invention is usually not more than 10% by weight, preferably not more than 5% by weight. The layer A may also contain an additive(s) which is known to be contained in a polyester film, such as fluorescent brightener, antistatic agent, UV absorber, lubricant, flame retardant, etc.

In the biaxially oriented laminated polyester film according to the present invention, it is essential that the layer A be present on at least one surface of a layer (layer B) made of a polyester other than the one composed of the layer A. The laminate structure of the polyester film of the present invention may be A/B, A/B/A or A/B/A', wherein A' is a layer which is the same in composition as the layer A, but different in thickness from the layer A. The layer B may itself have a laminated structure. This layer B will be described more particularly later.

In the present invention, the thickness of the layer A needs to be not more than 2 $\mu$m, preferably not more than 1 $\mu$m, more preferably not more than 0.5 $\mu$m. When the thickness of the layer A exceeds 2 $\mu$m, the produced films become liable to blocking when they are placed overlapping each other. The blocking can hardly be avoided even if a coating layer such as described below is provided on the layer A having a thickness more than 2 $\mu$m. When the thickness of the layer A is in a range of 0.01 to 0.5 $\mu$m, there takes place no blocking of the films, and further, the coating layer provided thereon can be strongly bonded. The lower limit of the layer A thickness is 0.001 $\mu$m. If the layer A thickness is less than 0.001 $\mu$m, the bonding effect of this layer to the coat will be lessened. It is preferable for the same reason that the layer A' in the laminated structure is less than 2 $\mu$m in thickness.

The laminate structure of the biaxially oriented polyester film of the present invention is formed by a coextrusion method in which the layer A and the layer B are joined and laminated when they are melt-extruded. Known methods such as extrusion lamination and dry lamination can be used for laminating the layer A on the layer B. In the known lamination methods, however, usually lamination is made on an already biaxially oriented film. On the other hand, according to the coextrusion method, biaxial orientation is conducted after lamination.

Therefore, the biaxially oriented laminated polyester film of the present invention obtained by the coextrusion method is excellent in thickness precision of the layer A and adhesion between the layer A and the layer B.

Also, in a preferred embodiment of the present invention, as more fully described later, there is employed an in-line coating system in which a coating solution containing a water-soluble or water-dispersible resin is applied thereon and then the obtained film is stretched in the film stretching step. In this case, after laminating the layer A and the layer B, biaxial orientation is conducted.

The layer B of the biaxially oriented laminated polyester film of the present invention is composed of a polyester other than the one used for the layer A. Preferably the layer B is composed of polyethylene terephthalate (PET), polyethylene naphthalate (PEN) or poly-1,4-cyclohexanedimethylene terephthalate (PCT), but it may be composed of a copolymer or a blend of the said resin and not more than 10 mol % of other resin, for example, the resin used for the layer A. It is recommended to prepare the layer B raw material by recycling part or whole of the scraps produced in the film forming process. In this case, the copolymer used for the layer A is mixed in the said layer B raw material.

In the layer B, if desired, the fine particles may be allowed to exist in the layer A. These fine particles may be of the same kind, same size and same content as used in the layer A. The particles in the layer A and those in the layer B may be the same or different from each other.

In the case where the layer B itself has a laminated structure, the said fine particles may be added in the whole of the layer B, or may be added only in the layer forming the surface of the layer B or only in the intermediate layer. If desired, different particles may be added to the surface layer and the intermediate layer.

Also, for the layer B, a mixture of a polyester and a polymer incompatible therewith, such as a crystalline polyolefin, may be used. When such a mixed material is used, voids can be formed around the incompatible polymer by stretching to adjust the film density of the layer B to a range of 0.4 to 1.2 g/cm$^3$. In this case, the content of the incompatible polymer is selected usually from a range of 1 to 25% by weight based on the polyester used for the layer B.

The biaxially oriented laminated polyester film of the present invention is characterized in that a coating layer containing an acrylic or urethane-based resin is formed on the surface of the said layer A.

The acrylic-based resins usable in the present invention are discussed.

As the acrylic-based resin used in the present invention, polymers composed of not less than 30 mol % of at least one acrylic-based monomer and not more than 70 mol % of other vinyl monomer copolymerizable with the said acrylic-based monomer are usable.

Examples of the acrylic-based monomers usable in the present invention include acrylic acid, methacrylic acid, alkyl acrylate, alkyl methacrylate, hydroxyalkyl acrylate, hydroxyalkyl methacrylate, acrylamide and acrylonitrile. Examples of the alkyl groups of alkyl acrylate and alkyl methacrylate are methyl, n-propyl, isopropyl, n-butyl, isobutyl, 2-ethylhexyl, lauryl, stearyl and cyclohexyl.

Particularly, in the case where the biaxially oriented laminated polyester film according to the present invention is used as base film for sublimation thermal transfer, the acrylic-based resin used for coating is preferably selected from hard acrylic-based resins containing not less than 30 mol % of at least one acrylic-based monomer, not more than 70 mol % of other vinyl monomer copolymerizable therewith, and not more than 30 mol % of a vinyl monomer (monomer for hard segment) capable of hardening the acrylic-based resins.

The monomer for hard segment used here is preferably a monomer which, when made into a homopolymer, have a glass transition temperature (Tg) of not less than 30° C. The preferred range of Tg is not less than 40° C., more preferably not less than 50° C. In case of using a monomer whose Tg is less than 30° C., there may not be obtained desired adhesiveness when the biaxially oriented laminated polyester film is used as base film for sublimation thermal transfer.

The conventional method for elevating Tg of acrylic-based resin by increasing the percentage of the monomer for hard segment has been considered impractical as this method causes an excessive reduction of adhesiveness to the base polyester film. According to the present invention, such reduction of adhesiveness can be avoided due to the presence of the layer A described above. However, when Tg of the acrylic-based resin used is too high, the lowest film forming temperature arises accordingly, so that the upper limit of Tg of the acrylic-based resin is preferably set at 130° C., more preferably at 110° C.

The monomer for hard segment may be an acrylic-based monomer or other vinyl monomer. Examples of such monomers are alkyl acrylate, alkyl methacrylate, acrylonitrile, vinyl acetate and styrene monomers. In the case where an acrylic-based monomer or other vinyl monomer (such as vinyl acetate) is used as starting monomer of the hard acrylic-based resin, the upper limit of its content is set at not more than 70 mol % in conformity to the above definition of acrylic-based resin.

In the present invention, it is recommended to use a vinyl monomer having a functional group for improving adhesiveness to the layer A and other functional layers or for improving affinity for other coating materials. The functional group may be bonded to the acrylic-based monomer or to other vinyl monomer copolymerizable therewith. Preferred examples of the functional group are carboxyl group and its salts, acid anhydride group, sulfonic group and its salts, amide group, hydroxyalkylated amide group, amino group (including substituted amino group) and its salts, hydroxyalkylated amino group and its salts, hydroxyl group, and epoxy group. Carboxyl group and its salts, acid anhydride group and epoxy group are especially preferred. The monomer may have two or more of these groups.

As the vinyl monomer having the said functional group (s), there can be used the compounds having the said functional group as reactive functional group, self-crosslinking functional group, or hydrophilic group. Examples of such compounds include the following.

Examples of the compounds having a carboxyl group or a salt thereof and the compounds having an acid anhydride group are acrylic acid, methacrylic acid, itaconic acid, maleic acid, metal (sodium, etc.) salts of these carboxylic acids, ammonium salts and maleic anhydride.

Examples of the compounds having a sulfonic group or a salt thereof are vinylsulfonic acid, styrenesulfonic acid, metal (sodium, etc.) salts of these sulfonic acids, and ammonium salts.

Examples of the compounds having an amide group or hydroxyalkylated amide group are acrylamide, methacrylamide, N-methylmethacrylamide, hydroxymethylated acrylamide, hydroxymethylated methacrylamide, ureidovinyl ether, β-ureidoisobutylvinyl ether and ureidoethyl acrylate.

Examples of the compounds having an amino group or hydroxyalkylated amino group or a salt thereof are diethylaminoethylvinyl ether, 2-aminoethylvinyl ether, 3-aminopropylvinyl ether, 2-aminobutylvinyl ether, dimethylaminoethyl methacrylate, dimethylaminoethylvinyl ether, compounds having these hydroxyalkylated amino groups, and the compounds having quarternary ammonium groups by a quartering agent such as alkyl halide, dimethylsulfuric acid and sultone.

Examples of the compounds having a hydroxyl group are β-hydroxyethyl acrylate, β-hydroxyethyl methacrylate, β-hydroxypropyl acrylate, β-hydroxypropyl methacrylate, β-hydroxyvinyl ether, 5-hydroxypentylvinyl ether, 6-hydroxyhexylvinyl ether, polyethylene glycol monoacrylate, polyethylene glycol monomethacrylate, polypropylene glycol monoacrylate and polypropylene glycol monomethacrylate.

Examples of the compounds having an epoxy group are glycidyl acrylate and glycidyl methacrylate.

Other compounds such as butylvinyl ether, maleic monoalkyl ester, maleic dialkyl ester, fumalic monoalkyl ester, fumalic dialkyl ester, itaconic monoalkyl ester, itaconic dialkyl ester, methyl vinyl ketone, vinyl chloride, vinylidene chloride, vinylpyridine, vinylpyrrolidone, vinyltrimethoxysilane and the like may be used in combination with the compounds mentioned above.

The biaxially oriented laminated polyester film of the present invention is preferably produced by employing an in-line coating system in which a coating solution containing a water-soluble or water-dispersible resin is applied on a base film and then the coated film is stretched in the film stretching step. In view of this, the acrylic-based resin used in the present invention is preferably one which contains an anionic or cationic group and is water-soluble or water-dispersible.

Examples of the anionic group are carboxylic group, sulfonic group and salts thereof. Quarternary ammonium salt is an example of the cationic group. An acrylic-based resin containing an anionic or cationic group can be obtained by selecting a pertinent vinyl monomer(s) such as mentioned above. The content of the anionic or cationic group is preferably in a range of 0.05 to 8 wt %. When the content of the anionic or cationic group is less than 0.05 wt %, the water solubility or water dispersibility of the acrylic-based resin may be deteriorated, and when the content exceeds 8 wt %, the water resistance of the coating layer may lower or the films may become liable to blocking by absorbing moisture. "Urethane-based resin" refers to the high-molecular weight compounds having urethane bonds and comprises a polyol, a polyisocyanate, a chain lengthening agent and a crosslinking agent.

As polyol, there can be used polyethers such as polyoxyethylene glycol, polyoxypropylene glycol and polyoxytetramethylene glycol; polyesters produced from dehydration reaction of dicarboxylic acids and glycols such as polyethylene adipate, polyethylene-butylene adipate and polycaprolactone; polycarbonates having carbonate bonds; acrylic-based polyols, and castor oil.

As polyisocyanate, tolylene diisocyanate, phenylene diisocyanate, 4,4'-diphenylmethane diisocyanate, hexamethylenediisocyanate, xylene diisocyanate, 4,4'-dicyclohexylmethane diisocyanate, isophorone diisocyanate and the like can be used.

As chain lengthening agent or crosslinking agent, ethylene glycol, propylene glycol, butanediol, hexanediol, diethylene glycol, trihydroxymethylated propane, hydrazine, ethylenediamine, diethylenetriamine, 4,4'-diaminodiphenylmethane, 4,4'-diaminodicyclohexylmethane, diethanolamine and water can be used.

The urethane-based resin used in the present invention is preferably one which contains an anionic or cationic group and is water-soluble or water-dispersible for the same reason as in the case of the said acrylic-based resin. A polyurethane-based resin having an anionic group can be obtained by bonding a compound having an anionic group to a resin by means of copolymerization or graft reaction. Anionic group is properly selected from sulfonic acid group, carboxylic acid group, phosphoric acid group and salts thereof. The content of the anionic or cationic group is preferably in a range of 0.05 to 8 wt % for the same reason as in the case of the said acrylic-based resin.

Specifically, a polyurethane-based resin having an anionic group can be produced, for example, by a method using a polyol as polyurethane-forming component, a polyisocyanate compound, chain lengthening agent, and a compound having an anionic group, a method in which the unreacted isocyanate group of a produced polyurethane is reacted with a compound having an anionic group, or a method in which a group having active hydrogen of a polyurethane is reacted with a specific compound.

The biaxially oriented laminated polyester film according to the present invention has a coating layer containing an acrylic-based resin or an urethane-based resin such as mentioned above (hereinafter referred to as coating substance) on the surface of the said layer A. The coating solution for forming the coating layer is preferably prepared by using water medium for safety and hygiene, and it is actually prepared by dissolving or dispersing the said coating substance in water. The said coating substance can be easily dissolved or dispersed in water depending on the type of the monomer used. If necessary, a small quantity of an organic solvent may be used as a dissolution or dispersion assistant in the preparation of the coating solution.

As for the kind of the coating solution using water as medium, it may be a coating solution in which an acrylic-based resin or urethane-based resin has been forcively dispersed by a surfactant or other suitable agent, but it is preferable to use a self-dispersing type coating solution comprising a coating substance containing a hydrophilic nonionic component such as polyethers or a cationic group such as quaternary ammonium salt. A water-soluble or water-dispersible coating composition using a coating substance having an anionic group is most preferred.

In the said coating solution may be contained the particles for improving slip property of the coating layer. Such particles may be either inorganic particles or organic particles.

Examples of the inorganic particles usable for the said purpose are the particles of silica, silica sol, alumina, alumina sol, zirconium sol, kaolin, talc, calcium carbonate, calcium phosphate, titanium oxide, barium sulfate, carbon black, molybdenum sulfide and antimony oxide sol. Examples of the organic particles are the particles of the homopolymers or copolymers such as polystyrenes, polyethylenes, polyamides, polyesters, polyacrylic esters, epoxy resins, polyvinyl acetate and polyvinyl chloride. These copolymers may contain a crosslinking agent. Particles of silicone resins, fluorine resins and the like are also usable as organic particles.

The said coating solution may also contain a crosslinking agent for improving anti-block properties, water resistance, solvent resistance and mechanical strength of the coating layer. Examples of the crosslinking agents usable for the said purpose include hydroxymethylated- or hydroxyalkylated-urea-based compounds, melamine-based compounds, guanamine-based compounds, acrylamide-based compounds and polyamide-based compounds, isocyanate compounds, epoxy compounds, aziridine compounds, silane coupling agents, titanium coupling agents, zirco-aluminate coupling agents, peroxides, heat- and light-reactive vinyl compounds and photosensitive resins.

The said coating solution may further contain where necessary other additives such as defoaming agent, coating performance improver, thickener, antistatic agent, organic lubricant, antioxidant, ultraviolet absorber, foaming agent, dye, pigment, etc.

The content of the coating substance in the coating layer is not less than 50 wt %, preferably not less than 60 wt %, more preferably not less than 70 wt %, even more preferably not less than 80 wt %. When the content of the coating substance in the coating layer is less than 50 wt %, the desired adhesive performance of the present invention may not be obtained.

The thickness of the coating layer (final dry thickness) is usually in a range of 0.01 to 2 $\mu$m, preferably 0.02 to 1 $\mu$m, more preferably 0.03 to 0.2 $\mu$m. A coating layer thickness exceeding the above range may cause blocking of the films, while a layer thickness below the above-defined range makes it difficult to obtain a uniform coating layer, resulting in nonuniform coating on the products.

Various coating devices such as reverse roll coater, gravure coater, rod coater, air doctor coater, etc., described in Yuji Harasaki: Coating System, Maki Shoten, 1979, can be used for applying the said coating solution on the polyester film (layer A). Application of the coating solution may be conducted in a step outside the film forming process, but it is preferably conducted in the film forming process. For carrying out coating in the film forming process, the following methods can be employed for instance: the coating solution is applied on an unstretched polyester film and then the film is biaxially stretched either successively or simultaneously; the coating solution is applied on a monoaxially stretched film and then the film is stretched in the direction orthogonal to the initial monoaxial stretching direction; the coating solution is applied on a biaxially stretched polyester film and then the film is further stretched in the transverse direction and/or the machine direction.

The thickness ratio of the layer A to the layer B (layer A thickness/layer B thickness) of the biaxially oriented laminated polyester film of the present invention is usually not more than 1, preferably not more than 0.7, more preferably not more than 0.5, even more preferably less than 0.2. When such thickness ratio exceeds 1, mechanical strength of the film tends to lower and also the layer A surface tends to become liable to blocking.

The lower limit of the thickness of the biaxially oriented laminated polyester film according to the present invention is usually 0.5 µm, preferably 1 µm. When the film thickness is less than 0.5 µm, the film may not be able to have a satisfactory strength. The upper limit of the film thickness is 500 µm, preferably 100 µm, more preferably 50 µm, even more preferably 25 µm. The most appropriate film thickness is selected from the above range depending on the purpose of use of the film.

A process for forming a biaxially oriented polyester film according to the present invention is described below.

The polyester resin for the layer A and the polyester resin for the layer B are dried separately, then extruded from the separate extruders and laminated before the slot die by a feed block-type coextruder or laminated in the die head of a multi-manifold-type coextruder to integrate both layers A and B. Thereafter, the laminate is melt extruded into a sheet and cooled and solidified on a casting drum to obtain an unstretched film. It is recommended to apply electrostatic pinning technique for cooling, and solidification as a film with good flatness can be obtained.

Each of the resin extruders is preferably provided with a #600-mesh or finer mesh-sized filter to carry out extrusion under filtration, whereby it is possible to prevent mixing of contaminants and to reduce fisheyes. It is also recommended to install a static mixer and a metering pump in each melt line of resin since a film with uniform thickness can be obtained.

In the present invention, the said unstretched film is biaxially stretched to have it biaxially oriented. For stretching, it is preferred to employ a successive biaxially stretching method in which the film is first stretched in the machine direction and then stretched in the transverse direction. Stretching in the machine direction is carried out by selecting the suitable conditions (stretching temperature from a range of 50° to 180° C. and stretch ratio from a range of 2.0 to 9.0 times) in accordance with the polyester composition.

The stretching may be conducted in a single stage, but it is preferably carried out in two or more stages within the above-defined limits of stretching temperature and stretch ratio for improving uniformity of layer A thickness. The stretching temperature maybe the same in all stages or may differ from stage to stage. The stretching rate for stretching in the machine direction preferably falls in a range of 5,000 to 500,000%/min for obtaining uniformity in thickness of t he whole film.

In the present invention, the coating treatment is preferably carried out at a stage after the said stretching in the machine direction. A chemical treatment or a discharge treatment may be applied on the film before coating treatment for improving coating performance of the coating solution and its adhesiveness to the film.

A tenter is usually used for stretching in the transverse direction. This transverse stretching is preferably conducted under the following conditions:
stretching temperature=80°–170° C.;
stretch ratio=3.0–6.0 times;
stretching rate=100–200,000%/min. Thereafter, if necessary, the film may be restretched in the machine direction, transverse direction or in both directions.

In the present invention, the stretched film is heatset. The heat-setting is preferably conducted at a temperature of 180° to 250° C., more preferably 210° to 240° C. for 1 to 600 seconds.

According to the above-described process of the present invention, drying of the coating layer can be accomplished simultaneously and also coating thickness can be adjusted in accordance with the stretching ratio, so that it is possible to produce a film suited for use as a polyester base film at relatively low cost.

In the present invention, the layer A is melted or softened and its plane orientation is almost zeroed by the heat-treatment, but it is preferable to set the heat-treatment temperature above the crystalline melting point of the polyester constituting the layer A. In the case where the polyester has no crystalline melting point, the heat-setting temperature is preferably set above the heat softening temperature of the polyester. This can enhance adhesion between the coating layer and the polyester film. The reason for this phenomenon is not definitely known, but it is considered that since the layer A is melted or softened during heat-setting, the layer A and the coating layer provided on its surface are fused together at the interface thereof, and as a consequence, strong adhesion is provided.

In the present invention, the coating solution may be applied either one side (layer A) alone or on both sides of the laminated polyester film. In the case where the coating solution is applied on one side alone, a coating layer of a composition not included in the present invention may be formed as desired on the other side to afford other properties to the biaxially oriented polyester film of the present invention. The coating solution used in the present invention may be a mixture of acrylic-based resins or urethane-based resins, or if desired, it may contain other coating material(s) such as ester resin, vinyl-based resin, etc., for improving the coating solution or the coating layer. Also, a discharge treatment may be applied on the coating layer after formation of the coating layer in order to further improve coating performances and adhesiveness of the coating layer of the biaxially oriented laminated polyester film of the present invention.

In the biaxially oriented laminated polyester film of the present invention, various functional layers may be formed on the surface of the coating layer. For example, a functional layer containing at least one kind of resin selected from gelatin-based resin, PVA-based resin, PVB-based resin, cellulose-based resin and derivatives thereof may be formed on the said polyester film. All known types of resin can be used for forming such functional layer(s). These resins are favorably used as binder for the functional layer(s) in the photographic film, ink receiving film and plate-forming film. The biaxially oriented laminated polyester film of the present invention has excellent adhesiveness to the functional layers containing the said polymers and are, therefore, useful as base film for photographic film, ink receiving film, plate-forming film and such.

Further, because of its excellent adhesivenenss to metal-depositing layer, the biaxially oriented laminated polyester film according to the present invention is suited for a packaging material, a decorative material, a material for gold or silver threads, an indication material, a wiring board material, a magnetic recording material, a capacitor film, a window attachment, etc.

Now, the base film for sublimation type thermal transfer according to the present invention using the above-described biaxially oriented laminated polyester film is discussed.

The base film of the present invention can be applied to conventional sublimation thermal transfer. The lower limit of thickness of the base film is usually 0.5 μm, preferably 1 μm, more preferably 2 μm, even more preferably 3 μm, for the same reason as mentioned above. The upper limit of thickness of the base film is usually 15 μm, preferably 10 μm, more preferably 8 μm, even more preferably 6 μm. When the base film has a greater thickness than the upper limit defined above, there may not be obtained satisfactory printing sensitivity.

The sublimable ink layer formed on the surface of the coating layer of the base film is composed of a sublimable solid dye, such as yellow, magenta or cyan dye, dispersed in a binder. The following are the typical examples of the sublimable dyes usable in the said ink layer:

(a) Yellow: Color Index Disperse Yellow 7 (such as Yellow 5RX (trade name, produced by BASF Corp.)).
(b) Magenta: Color Index Disperse Red 60 (such as RED-FBL (trade name, produced by Sumitomo Chemical Industries Co., Ltd.).
(c) Cyan: Color Index Solvent Blue 108.

It is ideal to use a sublimable dye which sublimes sharply in a relatively narrow range of transfer temperature close to the optimal temperature. The dyes applicable to thermal transfer are mostly of the type whose molecular weight is in a range of 230 to 370. Such dyes not only have the sublimation property suited for dyeing but are also of a particle size that allows easy diffusion of the dye in the inside of the article to be dyed. Structurally, these dyes preferably contain no ionic group such as sulfonyl group or carboxyl group, but has a polar group such as hydroxyl group, amino group, nitro group or sulfonic group to a pertinent degree.

The binder used for the sublimable ink layer is preferably one which has the specific properties to let the dye molecules sublime easily and to allow uniform dispersion of the dye. Examples of such binders are cellulose-based resins, acrylic-based resins, polyvinyl alcohol (PVA)-based resins, polyvinyl butyral (PVB)-based resins and polyamide resins. Of these resins, cellulose-based resins and PVB-based resins are preferably used, the former being most preferred.

As for the content of the dye in the sublimable ink layer, a more content can provide a higher color concentration, but since the dye content involves the problem on dispersibility of the dye in the binder, it should be decided in consideration of the required product properties for the particular use. The thickness of the sublimable ink layer is preferably in a range of 0.5 to 10 μm, more preferably 1 to 5 μm.

The base film for sublimation thermal transfer according to the present invention has excellent adhesiveness to the sublimable ink layer, and in use for transfer recording, the sublimation ink layer won't be caused to peel off and attach to the image receiving paper, thus allowing excellent image formation.

Now, the base film for metallized film capacitor of the present invention using the above-described biaxially oriented laminated polyester film is discussed.

The biaxially oriented laminated polyester film of the present invention can be used as the base film the conventional metallized film capacitors. The thickness of this base film may be the same range as specified above.

The metals usable for vapor-deposition include aluminum, palladium, zinc, nickel, gold, silver, copper, indium, tin, chromium, titanium, silicon and the like. Of these metals, aluminum is especially preferred. Oxides of the said metals are also usable.

The thickness of the vapor-deposited metal film is usually in a range of 1 to 500 nm, but it is preferable to reduce the thickness as much as possible within limits except for deteriorating the effect thereof. The upper limit of the deposit thickness is 500 nm, preferably 100 nm, more preferably 80 nm, even more preferably 60 nm.

The vapor-deposition is usually conducted by vacuum evaporation method, but other methods such as electroplating or sputtering method can be used. A vapor-deposited metal film may be provided on both sides of the base film. The vapor-deposited metal film may be subjected to a pertinent surface treatment or other treatments such as coating treatment with a resin.

Capacitor can be fabricated according to a conventional method. For example, two sheets of the said metallized film are placed lapping each other and wound up, or many sheets of the said metallized film are laminated together, thereby forming a capacitor element, and this element is subjected to necessary treatments such as hot pressing, taping, metallikon, voltage treatment, sealing of both end surface, attachment of lead wires, etc., to make a capacitor. In the above process, the capacitor element may be a combination of the biaxially oriented laminated polyester film of the present invention and other both-side metallized polyester film.

Since the biaxially oriented laminated polyester film according to the present invention has an excellent moist heat resistance and a long-time reliability of the capacitors can be improved.

EXAMPLES

The present invention is further illustrated by the following examples. It should be understood, however, that these examples are merely intended to be illustrative and not to be construed as limiting the scope of the invention.

The evaluation methods used in the following Examples and Comparative Examples are as explained below. Also, in the following Examples and Comparative Examples, all "parts" are "part by weight" unless otherwise noted.

(1) Layer thickness

A sample of biaxially oriented laminated polyester film was fixed by embedding it in a resin so that its section in the thickness direction could be observed, and a 100 nm-thick piece was cut out from the said sample by a microtome and observed under a transmission electron microscope (H-9000, manufactured by Hitachi Corp.) to determine the thickness of the respective layers (10,000–20,000× magnification; accelerating voltage: 100 kV).

(2) Crystalline melting point (Tm) of polyester

Using a differential calorimeter (SSC-580 DSC-20, manufactured by Seiko Electronic Industry Co., Ltd.), approximately 10 mg of polymer was heated at a heating rate of 10° C./min in a nitrogen stream and the temperature corresponding to the top of the heat absorption peak due to crystalline melt was measured and indicated as crystalline melting point (°C.).

(3) Evaluation of adhesive properties (i) Adhesiveness to gelatin

A 5% aqueous solution of photographic gelatin (P-2225, produced by Nitta Gelatin Co., Ltd.) was applied on the coating layer surface of the sample film to a dry coating thickness of 0.6 μm, and then hot-air dried at 80° C. for one minute to prepare a film for evaluation. This evaluation film was placed in an atmosphere of 23° C. and 50% RH for 24 hours to regulate its temperature and moisture content, then a 18 mm-wide cellophane adhesive tape (produced by Nichiban Co., Ltd.) was pasted on the gelatin-applied side of the said film along a length of 7 cm in such a manner that no air cells would be entrapped inside the tape, and a constant load was given onto the adhesive tape by a manual-loading roll to have the tape attached fast to the film. Then the film having the said adhesive tape pasted thereto was subjected to an 180° peel test in which the film was fixed in the vertical direction, and a 500 g weight was connected to the top end of the cellophane tape and dropped gravitationally through a distance of 45 cm. Adhesiveness was evaluated according to the following three-rank criterion.

○: The peeled area of the ink layer was less than 10%. (Excellent adhesiveness)

Δ: The peeled area of the ink layer was 10 to 50%. (Good adhesiveness)

X: The peeled area of the ink layer exceeded 50%. (Poor adhesiveness)

(ii) Adhesiveness to polyvinyl alcohol (PVA)

Adhesiveness to PVA was evaluated in the same way as described in the above item (i), except that a 5%-aqueous solution of PVA (produced by Nippon Synthetic Chemical Industry Co., Ltd.) with a saponification degree of 88% was used as ink.

(iii) Adhesiveness to polyvinyl butyral (PVB) Adhesiveness to PVB was evaluated in the same way as described in the above item (i), except that a 5%-aqueous solution of Butval B-98 (trade name, PVB produced by Mitsubishi Monsanto Chemical Co., Ltd., by butyralating 80 mol% of hydroxyl groups of perfectly saponified PVA with butylaldehyde) was used as ink.

iv) Adhesiveness to cellulose

Adhesiveness to cellulose was evaluated in the same way as described in the above item (i), except that a 2% aqueous solution of hydroxypropylmethyl cellulose (Marpolose MP, produced by Matsumoto Yushi Seiyaku CO., LTD.) was used as ink.

(4) Anti-block properties Films were placed lapping each other and treated in a 40° C. and 80% RH-thermostat for 20 hours under a press load of 10 kgf/cm$^2$. Then the films were cut to a 10 cm-width, and (anti-) block properties of the films was determined according to the method of ASTM-D-1893, in which the attached films were peeled using a piano wire, and evaluated according to the following criterion:

○: Force required for peeling off was less than 30 gf.

Δ: Force required for peeling off was 30–100 gf.

X: Force required for peeling off was not less than 100 gf.

(5) Adhesiveness to sublimable ink layer

An adhesive tape Scotch Mending Tape 810 (trade name, produced by 3M Co., Ltd.) was pasted to the sublimable ink layer, so that no air cells would be entrapped therein, and then peeled off quickly. The degree of peeling-off of the ink layer was determined. Using yellow and cyan inks, adhesiveness to the sublimable ink layer at 25° C. was measured and evaluated according to the following three-rank criterion:

○: The peeled area of the ink layer was less than 10%. (Excellent adhesiveness)

Δ: The peeled area of the ink layer was 10 to 50%. (Good adhesiveness)

X: The peeled area of the ink layer exceeded 50%. (Poor adhesiveness)

(6) Disordered transfer of sublimable ink to image receiving paper

An image receiving paper having a 5 μm-thick dyed image receiving layer composed of 10 parts of a polyester (Vylonal MD-1200, produced by Toyo Boseki CO., LTD.) and one part of silica particles (Nipsil E200A, produced by Nippon Silica Kogyo CO., LTD.) and a thermal transfer recording sheet were placed overlapping each other on a 200 μm-thick high-quality paper, and transfer recording was carried out thereon using a thermal head with an 8 dot/mm-exothermal resistor recording density by applying a power of 0.3 W/dot for 10 milliseconds. It was visually observed whether the sublimable ink had been passed onto the image receiving paper, and evaluation was made according to the following three-rank criterion:

○: No disordered transfer of ink took place.

Δ: A slight degree of disordered transfer was observed, and the commercial value of the product dropped.

X: Frequent disordered transfer of ink occurred, and the laminate could not stand practical use.

(7) Adhesiveness to vapor-deposited metal film Using a resistance heating-type metallizing apparatus, with the pressure in the vacuum chamber adjusted to be below $10^{-4}$ Torr, aluminum was deposited to a thickness of 45 nm. On the deposited metal surface of the metallized film, a polyurethane-based two-pack curable adhesive (composed of 100 parts of AD-502 and 10 parts of CAT-10, both being produced by Toyo Morton Co., Ltd.) was coated to a dry weight of 5 g/cm$^2$, and then a polyester film of the same thickness as the base polyester film was laminated by ordinary dry lamination, followed by aging at 40° C. for 48 hours. The resultant laminate was cut into a 15 mm-wide strip and immersed in 60° C.-hot water for 30 minutes (hot water treatment).

An end of the hot-water treated sample was partly peeled and then the sample was T-peeled at a rate of 100 mm/min by a peel tester. Adhesiveness was evaluated according to the following three-rank criterion:

○: Force required for peeling off was not less than 100 gf.

Δ: Force required for peeling off was not less than 10 gf and less than 100 gf.

X: Force required for peeling off was less than 10 gf.

(8) Change of electrostatic capacity (i) No-load test

The sample capacitor was left in a 60° C. and 95% RH-atmosphere for 1,000 hours, and the change of electrostatic capacity was determined based on the initial electrostatic capacity. Namely, the initial electrostatic capacity was deducted from the electrostatic capacity after 1,000 hours, and the obtained value was divided by the initial electrostatic capacity and expressed by percentage.

(ii) Load test

The sample capacitor was left in a 60° C. and 95% RH-atmosphere for 1,000 hours while applying a DC voltage of 60 V/μm across the electrodes, and the change percentage of electrostatic capacity was determined based on the initial electrostatic capacity. Namely, the initial electrostatic capacity was deducted from the electrostatic capacity after 1,000 hours, and the obtained value was divided by the initial electrostatic capacity and expressed by percentage.

The polyester resins used in the following Examples were prepared in the manners described below.

Polyester Resin 1

80 parts of dimethyl terephthalate, 20 parts of dimethyl isophthalate, 65 parts of ethylene glycol, 55 parts of 1,4-butanediol and 0.09 parts of magnesium acetate were heated in a reactor to carry out ester exchange reaction while distilling away methanol. The reaction mixture was heated to 230° C. in about 4 hours after starting the reaction, to substantially complete the ester exchange reaction. Then, 0.4 parts of ethyl acid phosphate and 0.04 parts of antimony trioxide were added and the pressure in the reaction system was gradually reduced from normal pressure to finally reaching 1 mmHg. Four hours later, the reaction system was returned to normal pressure to obtain a polyester resin (polyester 1). There was observed no crystalline melt peak in differential thermal analysis of the polyester 1.

Polyester Resin 2

60 parts of dimethyl terephthalate, 40 parts of dimethyl isophthalate, 55 parts of 1,4-butanediol and 0.09 parts of magnesium acetate were heated in a reactor to carryout ester exchange reaction while distilling away methanol. The reaction mixture was heated to 230° C. in about 4 hours after starting the reaction, to substantially complete the ester exchange reaction. Then, 0.4 parts of ethyl acid phosphate and 0.04 parts of antimony trioxide were added and the pressure in the reaction system was gradually reduced from normal pressure to finally reaching 1 mmHg. Four hours later, the reaction system was returned to normal pressure to obtain a polyester resin (polyester 2). The crystalline melting point of the polyester 2 was 151° C.

Polyester Resin 3

100 parts of dimethyl terephthalate, 65 parts of ethylene glycol and 0.09 parts of magnesium acetate were heated in a reactor to carry out ester exchange reaction while distilling away methanol. The reaction mixture was heated to 230° C. in about 4 hours after starting the reaction, to substantially complete the ester exchange reaction. At this point, amorphous silica having an average particle diameter of 1.25 μm was added in the form of an ethylene glycol slurry so that it would exist with a concentration of 0.1% in the polymer. Then, 0.4 parts of ethyl acid phosphate and 0.04 parts of antimony trioxide were added and the pressure in the reaction system was gradually reduced from normal pressure to finally reaching 1 mmHg. Four hours later, the reaction system was returned to normal pressure to obtain a polyester resin (polyester 3). The crystalline melting point of the polyester 3 was 259° C.

The coating materials used in the following Examples are as follows.

A1 (acrylic-based resin): A water-dispersible acrylic-based resin composed of 25 mol % of methyl methacrylate (105° C.), 30 mol % of n-butyl acrylate (−54° C.), 40 mol % of styrene (100° C.) and 5 mol % of ammonium salt of acrylic acid (106° C.).

A2 (acrylic-based resin): A water-dispersible acrylic-based resin composed of 65 mol % of methyl acrylate (105° C.), 30 mol % of n-butyl methacrylate (−54° C.) and 5 mol % of ammonium salt of acrylic acid (106° C.).

A3 (acrylic-based resin): A water-dispersible acrylic-based resin composed of 50 mol % of ethyl acrylate (−22° C.), 35 mol % of n-butyl methacrylate (−54° C.), 10 mol % of 2-hydroxyethyl methacrylate (55° C.) and 5 mol % of ammonium salt of methacrylic acid (130° C.).
Note: Temperatures in the parentheses are Tg of homopolymer.

B1 (urethane-based resin): 472 parts of diethyl carbonate, 416 parts of 1,5-pentanediol and 472 parts of 1,6-hexanediol were reacted at 120° to 200° C. for 15 hours. Then the reaction system was adjusted to 150° C. and the remaining ethanol and unreacted diol were sufficiently distilled away under a reduced pressure of 10 to 50 mmHg to obtain a polycarbonate polyol. The hydroxyl value of the obtained polyol was about 66 and its number-average molecular weight was about 2,000. 500 parts of this polycarbonate polyol, 160 parts of tolylene diisocyanate, 58.5 parts of dihydroxymethylated propane having its carboxyl groups neutralized with triethylamine, and 1,647 parts of methyl ethyl ketone (MEK) were supplied into a reactor to carry out urethane reaction at 80° C. for 4 hours. The resulting solution was gradually added to 1,562 parts of distilled water with stirring and, after adding 106.5 parts of a 20%-aqueous solution of isophoronediamine, the mixed solution was heated to 40° C. to carry out polymerization reaction for one hour. MEK was removed under reduced pressure to obtain a polycarbonate polyurethane emulsion B1 with a solid content of 30%.

B2 (urethane-based resin): The above B1 preparation procedure was conducted except for use of 1,4-butanediol in place of 1,5-pentanediol to obtain a polycarbonate polyurethane emulsion B2.

B3 (urethane-based resin): The above B1 preparation procedure was conducted except for use of 1,4-butanediol in place of 1,6-hexanediol to obtain a polycarbonate polyurethane emulsion B3.

C1 (polyester resin): A water-dispersible polyester resin composed of 35 mol % of terephthalic acid, 5 mol % of sodiumsulfoisophthalic acid, 49 mol % of ethylene glycol and 1 mol % of diethylene glycol.

Example 1

Polyester resin 1 used for the layer A and polyester resin 3 used for the layer B were dried separately at 180° C. for 4 hours and then melt-extruded by a three-layer coextruder at an extruding temperature of 280° C. for the layer A and 290° C. for the layer B. In this operation, the said both types of resin were filtered by a #600-mesh filter, and joined and laminated by a feed block to provide an A/B/A laminated construction.

The laminate was extruded into a sheet from the slot die and cooled and solidified on a 30° C.-casting roll while applying the electrostatic pinning technique to obtain a three-layer-structure unstretched film. The discharge rate of each extruder was adjusted so that the surface layer A would have the thickness shown in Table 1.

The thus obtained unstretched film was stretched 2.9 times in the longitudinal direction at 83° C. and then further stretched 1.25 times at 76° C., by roll stretching. Then, a coating solution of the composition shown in Table 1 was applied on both sides of the stretched film. This film was then led into a tenter to stretch 3.8 times in the width direction at 110° C. and heat-set at 230° C. for 15 seconds to obtain a biaxially oriented laminated polyester film having an overall thickness of 50 μm and a coating layer thickness of 0.12 μm. The adhesiveness evaluation results of the obtained film are shown in Table 1.

Examples 2–5

The procedure of Example 1 was carried out except that the composition of the coating solution was changed as shown in Table 1 to obtain biaxially oriented laminated polyester films. The adhesiveness evaluation results of the obtained films are shown in Table 1.

Example 6

In polyester resin 3 used in Example 1, 20 wt % of crystalline polypropylene with a melt flow index of 4.5 was uniformly blended, and the obtained blend was used as resin for the layer B (This resin for the layer B is indicated by 3' in Table 1.). Polyester resin 1 was used as resin for the polyester layer A. The said both kinds of resin were dried separately and melt-extruded by the same three-layer coextruder as used in Example 1 at an extruding temperature of 280° C. for the layer A and 290° C. for the layer B. In the above operation, both kinds of resin were screened by a #600-mesh-filter and joined and laminated by a feed block to provide an A/B/A laminated construction.

Then the laminate was extruded into a sheet from the slot die and cooled and solidified on a 30° C.-casting roll while applying electrostatic pinning technique to obtain a three-layer structured unstretched film. This film was treated in the same way as in Example 1 to obtain a biaxially oriented laminated polyester film. The adhesiveness evaluation results of the obtained film are shown in Table 1.

Comparative Examples 1 and 2

The procedure of Example 1 was conducted except that the composition of the coating solution was changed as shown in Table 2 to obtain biaxially oriented laminated polyester films. The evaluation results of these films are shown in Table 2. In Comparative Example 2, the layer A thickness was changed to 4.0 μm.

Comparative Example 3

The procedure of Example 1 was conducted except that polyester resin 3 was used as starting material, and that it was melt-extruded using not a coextruder but a single-layer extruder at an extruding temperature of 290° C. without laminating other kind of polyester to obtain a 50 μm-thick biaxially oriented polyester film. The adhesiveness evaluation results of this film are shown in Table 2.

Comparative Example 4

The procedure of Example 1 was conducted except that no coating layer was provided to obtain a biaxially oriented polyester film. The adhesiveness evaluation results of the obtained film are shown in Table 2.

TABLE 1

|  | Ex. 1 | Ex. 2 | Ex. 3 | Ex. 4 | Ex. 5 | Ex. 6 |
| --- | --- | --- | --- | --- | --- | --- |
| Kind of layer A | 1 | 1 | 1 | 1 | 2 | 2 |
| Layer A thickness (μm) | 0.3 | 0.3 | 0.3 | 0.3 | 0.3 | 0.3 |
| Kind of layer B | 3 | 3 | 3 | 3 | 3 | 3' |
| Coating layer composition |  |  |  |  |  |  |
| A1(wt %) | 100 | 0 | 0 | 60 | 100 | 100 |
| A2(wt %) | 0 | 100 | 0 | 0 | 0 | 0 |
| A3(wt %) | 0 | 0 | 100 | 0 | 0 | 0 |
| C1(wt %) | 0 | 0 | 0 | 40 | 0 | 0 |
| Overall film thickness (μm) | 50 | 50 | 50 | 50 | 50 | 50 |
| Adhesiveness |  |  |  |  |  |  |
| To gelation | ○ | ○ | Δ | Δ | ○ | ○ |
| To PVA | ○ | ○ | Δ | Δ | ○ | ○ |
| To PVB | ○ | ○ | Δ | Δ | ○ | ○ |
| To cellulose | ○ | ○ | ○ | ○ | ○ | ○ |
| Anti-block properties | ○ | ○ | ○ | ○ | ○ | ○ |

TABLE 2

|  | Comp. Ex. 1 | Comp. Ex. 2 | Comp. Ex. 3 | Comp. Ex. 4 |
| --- | --- | --- | --- | --- |
| Kind of layer A | 1 | 1 | 3 | 1 |
| Layer A thickness (μm) | 0.3 | 4.0 | — | 0.3 |
| Kind of layer B | 3 | 3 | 3 | 3 |
| Coating layer composition |  |  |  |  |
| A1(wt %) | 0 | 100 | 100 | 0 |
| A2(wt %) | 0 | 0 | 0 | 0 |
| A3(wt %) | 0 | 0 | 0 | 0 |
| C1(wt %) | 100 | 0 | 0 | 0 |
| Overall film thickness (μm) | 50 | 50 | 50 | 50 |
| Adhesiveness |  |  |  |  |
| To gelation | X | ○ | X | X |
| To FVA | X | ○ | X | X |
| To PVB | X | ○ | X | X |
| To cellulose | X | ○ | X | X |
| Anti-block properties | ○ | Δ | ○ | ○ |

Examples 7–12 and Comparative Examples 5–8

(base film for sublimation thermal transfer)

The procedures of Examples 1 to 6 and Comparative Examples 1 to 4 were conducted except that the overall film thickness was changed to 4.5 μm to obtain biaxially oriented laminated polyester films.

On the non-coated side of each of the said films was provided a 0.10 μm-thick heat-resistant and high-slipperiness coating layer composed of 86 parts of a polyimide obtained from a benzophenone-3, 3', 4, 4'-tetracarboxylic acid anhydride, tolylene diisocyanate (80 mol %) and 4,4'-diphenylmethane diisocyanate (20 mol %), 7 parts of calcium carbonate particles having an average diameter of 0.07 μm and 7 parts of fluorine-based silicone oil (FL-100, produced by Shin-Etsu Chemical Industry Co., Ltd.).

On the coated side of each of the said films was formed a 2.0 μm-thick sublimable ink layer composed of 10 parts of Kayaset B (produced by Nippon Kayaku CO., LTD.), 15 parts of cellulose acetate propionate, 2 parts of silica gel and one part of hydroxymethylated melamine to produce a thermal transfer recording medium. The evaluation results of the obtained samples of thermal transfer recording medium are shown in Tables 3 and 4.

The test results of anti-block properties of the above biaxially oriented laminated polyester films are also shown in

TABLE 3

|  | Ex. 7 | Ex. 8 | Ex. 9 | Ex. 10 | Ex. 11 | Ex. 12 |
| --- | --- | --- | --- | --- | --- | --- |
| Ink adhesiveness |  |  |  |  |  |  |
| Yellow | ○ | ○ | Δ | Δ | Δ | ○ |
| Cyan | ○ | ○ | Δ | Δ | Δ | ○ |
| Anti-migratory characteristics of ink layer | ○ | Δ | ○ | Δ | Δ | ○ |
| Anti-block properties | ○ | ○ | ○ | ○ | ○ | ○ |

TABLE 4

|  | Comp. Ex. 5 | Comp. Ex. 6 | Comp. Ex. 7 | Comp. Ex. 8 |
|---|---|---|---|---|
| Ink adhesiveness | | | | |
| Yellow | X | ◯ | X | X |
| Cyan | X | ◯ | X | X |
| Anti-migratory characteristics of ink layer | X | ◯ | X | X |
| Anti-block properties | ◯ | Δ | ◯ | ◯ |

Examples 13–17 and Comparative Examples 9–12 (base film for metallized film capacitor)

The procedure of Example 1 was conducted except that the coating layer thickness and the overall film thickness were changed to 0.05 μm and 9.0 μm, respectively, and that the coating layer composition was changed as shown in Table 5 to obtain biaxially oriented laminated polyester films. In Example 17, however, polyester resin 3 was used for the layer A, and in Comparative Example 11, polyester 3 was used as the starting material, and the material was extruded not by a coextruder but by a single-layer extruder to obtain a 9 μm-thick single-layer biaxially oriented polyester film.

On the coated side of each of the said films, aluminum was deposited to a thickness of 45 nm using a resistance heating type metallizing machine with the pressure in the vacuum chamber being adjusted to less than $10^{-4}$ Torr. Aluminum was deposited in stripes with margins in the longitudinal direction of the polyester film (alternate repetition of 8 mm-wide deposited portion and 1 mm-wide margin). Each of the obtained metallized polyester film was slit into a 4.5 mm-wide tape having a 1 mm-margin along the left or right edge. Then one sheet of metallized polyester film having a left margin and the one having a right margin were combined and rolled up with a positional shift from each other so that a 0.5 mm-length of the deposited portion would project out sidewise. This roll of film was pressed under a pressure of 50 kg/cm² at 150° C. for 5 minutes.

Then, both end faces of the roll were subjected to thermal metallikon, followed by attachment of lead wires and impregnation with a liquid bisphenol A epoxy resin, and further a powdery epoxy resin was heat-fused on the surface to form a sheathing with a minimal thickness of 0.5 mm, thereby obtaining a film capacitor with an electrostatic capacity of 0.1 μF. The evaluation results of the thus obtained metallized film capacitors are shown in Tables 5 and 6.

As seen from Table 5, the metallized film capacitor using the base film of the present invention have excellent dielectric properties and moist heat resistance and are minimized in change of electrostatic capacity. Workability in manufacture and fixing of the capacitors was also good.

TABLE 5

|  | Ex. 13 | Ex. 14 | Ex. 15 | Ex. 16 | Ex. 17 |
|---|---|---|---|---|---|
| Kind of layer A | 1 | 1 | 1 | 1 | 2 |
| Layer A thickness (μm) | 0.3 | 0.3 | 0.3 | 0.3 | 0.3 |
| Kind of layer B | 3 | 3 | 3 | 3 | 3 |

TABLE 5-continued

|  | Ex. 13 | Ex. 14 | Ex. 15 | Ex. 16 | Ex. 17 |
|---|---|---|---|---|---|
| Coating layer composition | | | | | |
| B1(wt %) | 100 | 0 | 0 | 60 | 100 |
| B2(wt %) | 0 | 100 | 0 | 0 | 0 |
| B3(wt %) | 0 | 0 | 100 | 0 | 0 |
| C1(wt %) | 0 | 0 | 0 | 40 | 0 |
| Overall film thickness (μm) | 0 | 9 | 9 | 9 | 9 |
| Adhesiveness of A1 deposit | ◯ | ◯ | ◯ | Δ | ◯ |
| Anti-block properties | ◯ | ◯ | ◯ | ◯ | ◯ |
| Change of capacitor capacity | | | | | |
| No load (%) | 0.5 | 0.5 | 0.5 | 0.5 | −5.6 |
| Under load (%) | 0.5 | 0.5 | 0.2 | −5.5 | −20.9 |

TABLE 6

|  | Comp. Ex. 9 | Comp. Ex. 10 | Comp. Ex. 11 | Comp. Ex. 12 |
|---|---|---|---|---|
| Kind of layer A | 1 | 1 | — | 1 |
| Layer A thickness (μm) | 0.3 | 3.0 | — | 0.3 |
| Kind of layer B | 3 | 3 | 3 | 3 |
| Coating layer composition | | | | |
| B1(wt %) | 0 | 100 | 100 | 0 |
| B2(wt %) | 0 | 0 | 0 | 0 |
| B3(wt %) | 0 | 0 | 0 | 0 |
| C1(wt %) | 100 | 0 | 0 | 0 |
| Overall film thickness (μm) | 0 | 9 | 9 | 9 |
| Adhesiveness of A1 deposit | X | ◯ | X | X |
| Anti-block properties | ◯ | X | ◯ | ◯ |
| Change of capacitor capacity | | | | |
| No load (%) | −5.6 | — | 0.0 | −13.5 |
| Under load (%) | −21.9 | — | −9.6 | −50.5 |

Note:
In Table 6, Comp. Example 11 is a single-layer film.

What is claimed is:

1. A biaxially oriented laminated polyester film, comprising:
    a layer A, comprising a polyester having no crystalline melt peak at 230° C. or more in the differential thermal analysis and having a thickness of not more than 0.5 μm;
    a layer B comprising a polyester other than the polyester of layer A; and
    a coating layer comprising not less than 50 wt % of an acrylic resin or urethane resin as a coating component,
    said layer A being laminated onto at least one surface of said layer B, and said coating layer being disposed on a surface of said layer A,
    wherein said polyester film has less than 30 gf of anti-block properties, and wherein said polyester film is produced by a method comprising:
    (1) forming an unstretched polyester film by a process, comprising
        (a) separately drying the polyester resins for layer A and layer B,
        (b) extruding from separate extruders the separately dried polyester resins,
        (c) either laminating layers A and B before a slot die in a feed block coextruder or laminating in the die head in a multi-manifold coextruder, (d) melt-extruding the above-obtained laminate onto a sheet, and (e) cooling and solidifying the sheet on a casting drum, thus obtaining an unstretched film;

(2) stretching said unstretched film in the machine direction;

(3) applying to the machine stretched film said coating component;

(4) stretching said film in the transverse direction; and (5) heat-setting said film.

2. A biaxially oriented laminated polyester film according to claim 1, wherein said acrylic resin contains: not less than 30 mol % of at least one acrylic monomer, not more than 70 mol % of a vinyl monomer which is copolymerizeable with said acrylic monomer; and not less than 30 mol % of a vinyl monomer which is capable of hardening said acrylic monomer and which has a glass transition temperature (Tg) of not less than 30° C., when producing the homopolymer thereof.

3. A biaxially oriented laminated polyester film according to claim 2, wherein said vinyl monomer which is capable of hardening said acrylic monomer is at least one vinyl monomer selected from the group consisting of alkyl acrylate, alkyl methacrylate, acrylonitrile, vinyl acetate and styrene monomers.

4. A biaxially oriented laminated polyester film according to claim 1, wherein said acrylic resin or urethane resin is water-soluble or water-dispersible.

5. A biaxially oriented laminated polyester film according to claim 4, wherein said acrylic resin or urethane resin contains 0.05 to 8 wt % of anionic group or cationic group.

6. A base film for sublimation thermal transfer, comprising a biaxially oriented laminated polyester film set forth in claim 1.

7. A base film for sublimation thermal transfer according to claim 6, wherein the coating component is an acrylic resin.

8. A base film for metallized film capacitor, comprising a biaxially oriented laminated polyester film set forth in claim 1.

9. A base film for metallized film capacitor according to claim 8, wherein the coating component is an urethane resin.

10. A biaxially oriented laminated film according to claim 1, wherein said coating layer comprises inorganic or organic particles for improving the slip property of the coating layer.

11. A biaxially oriented laminated film according to claim 1, wherein said coating layer comprises a crosslinking agent for improving the anti-block properties, water resistance, solvent resistance and mechanical strength of the coating layer.

12. A method of using the biaxially oriented laminated film according to claim 1, comprising forming a sublimable ink layer on the surface of said coating layer.

13. A method of using the biaxially oriented laminated film according to claim 10 to form a metallized film capacitor, comprising vapor depositing at least one metal on at least one surface of the biaxially oriented laminated film.

14. A biaxially oriented laminated polyester film according to claim 1, wherein said layer A has a thickness of 0.001 $\mu$m to 0.5 $\mu$m.

15. A biaxially oriented laminated polyester film according to claim 1, wherein said film retains at least 50% of the ink when adhesion to sublimable ink is determined.

16. A method of making a biaxially oriented polyester film including a layer A, comprising a polyester having no crystalline melt peak at 230° C. or more in the differential thermal analysis and having a thickness of not more than 0.5 $\mu$m;

a layer B comprising a polyester other than the polyester of layer A; and a coating layer comprising not less than 50 wt % of an acrylic resin or urethane resin as a coating component, said layer A being laminated onto at least one surface of said layer B, and said coating layer being disposed on a surface of said layer A, wherein said polyester film has less than 30 gf of anti-block properties, said method comprising:

drying the polyester resins for layer A and layer B separately; extruding the polyester resins; laminating the polyester resins to integrate layers A and B; melt extruding the resulting laminate; cooling and solidifying the laminate on a casting drum; stretching the resulting film at least once, first in the machine direction, then in the transverse direction; and between stretching in the machine and transverse directions, applying the coating layer to layer A.

17. A method according to claim 16, wherein said stretching step is carried out at a temperature of from about 50° C. to about 180° C.

18. A method according to claim 16, wherein said machine stretching results in a stretch ratio of from about 2 to about 9 and wherein said transverse stretching results in a stretch ratio of from about 3 to about 6.

19. A method according to claim 16, wherein said stretching step is carried out in several stages.

20. A method according to claim 16, wherein the stretching rate of said stretching step is from about 5,000%/minute to about 500,000%/minute.

21. A method according to claim 16, comprising heat-setting said film.

* * * * *